(12) United States Patent
Lee

(10) Patent No.: US 7,201,052 B2
(45) Date of Patent: Apr. 10, 2007

(54) FUEL MEASURING DEVICE

(75) Inventor: Young-Gwon Lee, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 154 days.

(21) Appl. No.: 11/023,420

(22) Filed: Dec. 29, 2004

(65) Prior Publication Data

US 2006/0048571 A1    Mar. 9, 2006

(30) Foreign Application Priority Data

Sep. 7, 2004    (KR) ...................... 10-2004-0071359

(51) Int. Cl.
*G01F 23/46* (2006.01)
(52) U.S. Cl. ........................................................ 73/317
(58) Field of Classification Search ...................... None
See application file for complete search history.

(56) References Cited

U.S. PATENT DOCUMENTS 4,928,526 A * 5/1990 Weaver ........................ 73/313
6,508,119 B2 * 1/2003 Beck, II ....................... 73/291
6,711,950 B1 * 3/2004 Yamaura et al. ............. 73/317

FOREIGN PATENT DOCUMENTS

| KR | 10-2003-6361 | 1/2003 |
| KR | 10-2004-23952 | 3/2004 |

OTHER PUBLICATIONS

English Language Abstract of KOREA 10-2003-6361.
English Language Abstract of KOREA 10-2004-23952.

* cited by examiner

*Primary Examiner*—Hezron Williams
*Assistant Examiner*—Paul M. West
(74) *Attorney, Agent, or Firm*—Greenblum & Bernstein, P.L.C.

(57) ABSTRACT

The present invention relates to a fuel measuring device, more particularly, to a fuel measuring device having a non-intrusive (or non-contact) structure between a rotor and a magneto resistive sensor, resulting in reducing of measurement errors that are usually caused by imperfect mechanical contact or corroded contacts.

8 Claims, 2 Drawing Sheets

[FIG. 1] PRIOR ART
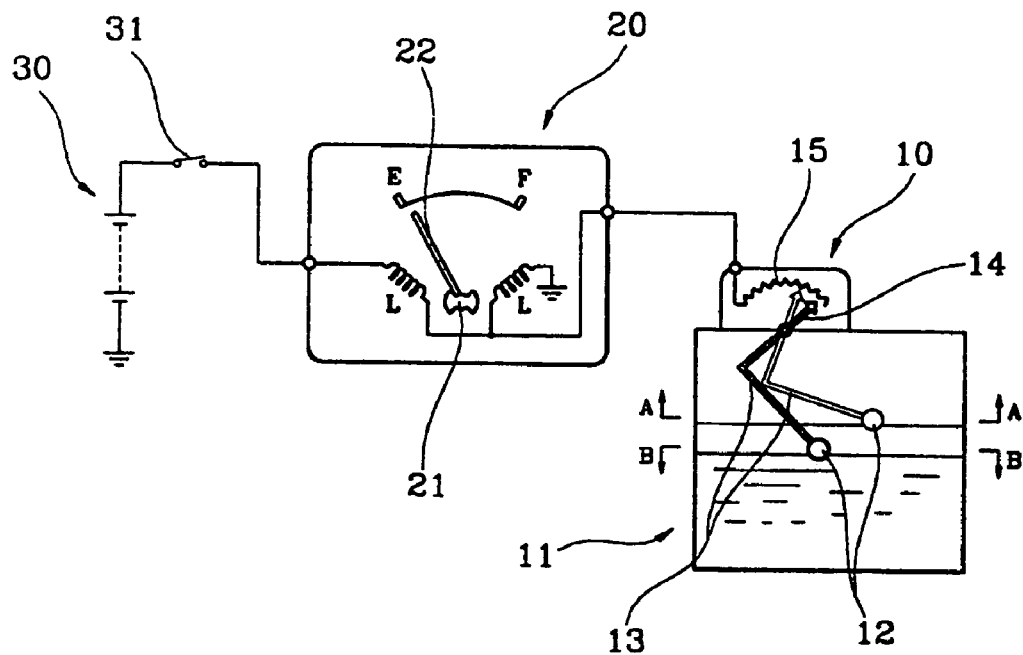
[FIG. 2]
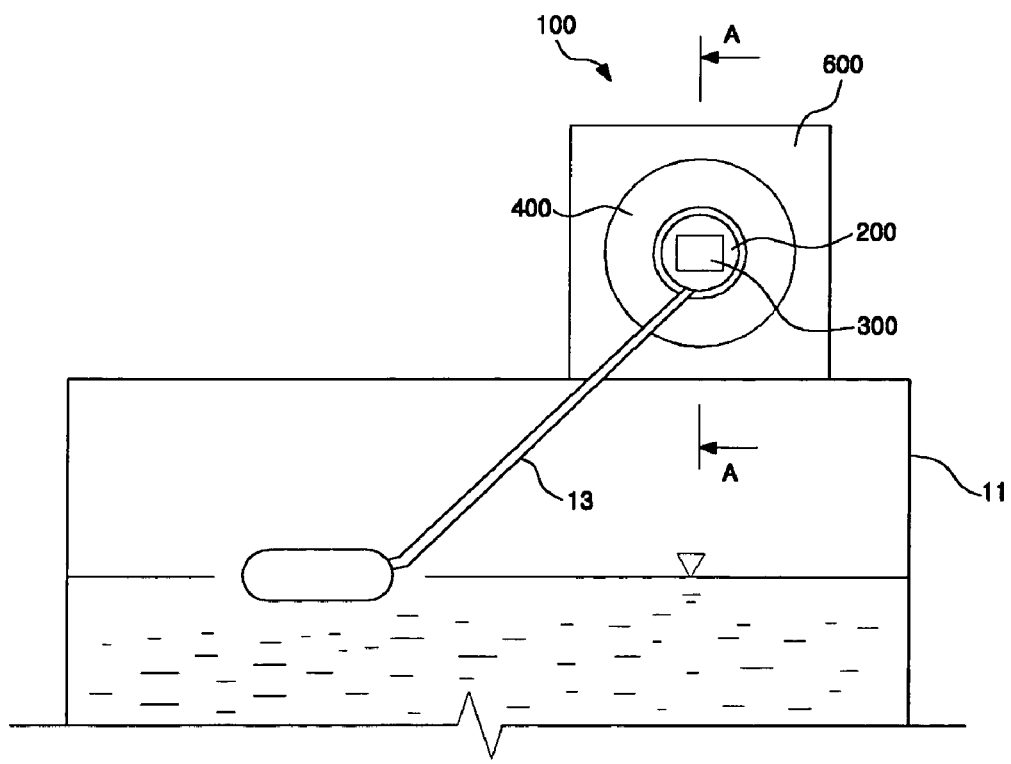

[FIG. 3]
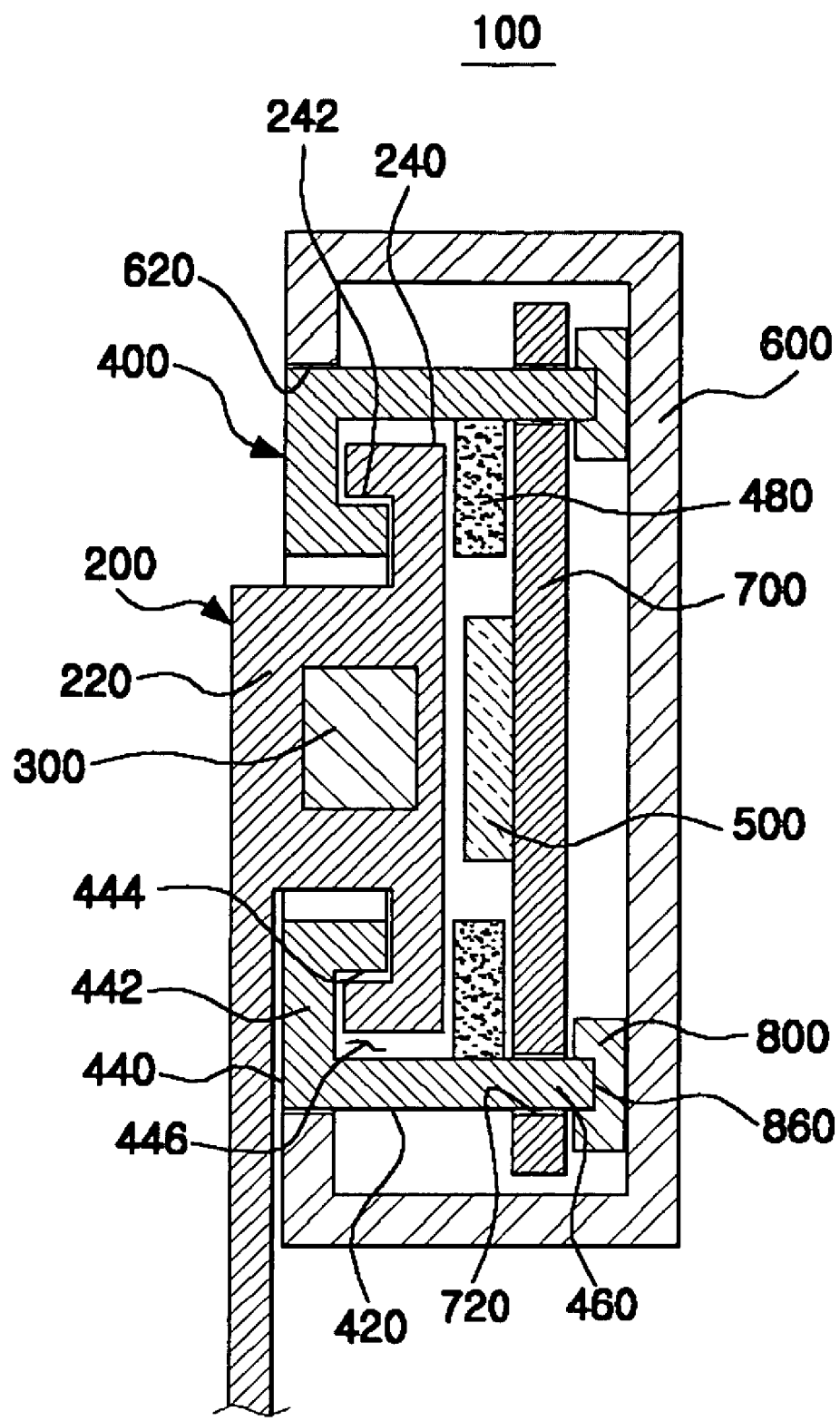

FUEL MEASURING DEVICE

RELATED APPLICATIONS

The present disclosure relates to subject matter contained in priority Korean Application No. 10-2004-0071359, filed on Sep. 7, 2004, which is herein expressly incorporated by reference in its entirety.

BACKGROUND OF THE INVENTION

1. Field of the Invention

The present invention relates in general to a fuel measuring device, more particularly, to a fuel measuring device having a non-intrusive (or non-contact) structure between a rotor and a magneto resistive sensor, resulting in reducing of measurement errors that are usually caused by imperfect mechanical contact or corroded contacts.

2. Description of the Related Art

In general, a fuel tank out of a fuel supply system is a device for storing fuel, and has a built-in fuel gauge for use in displaying fuel measurements to a dash panel of an automobile.

The fuel gauge for use in the fuel tank includes an adjustable resistive type sender unit 10, a coil-type receiver unit 20 connected to the adjustable resistive type sender unit 10, and a battery 30.

The adjustable resistive type sender unit 10, as shown in FIG. 1, includes a float 12 disposed inside the fuel tank 11, moving in the vertical direction with the liquid level of the fuel, a rotary rod 13 connected to the float 12 and rotatably disposed in the upper portion of the fuel tank 11, a contact arm 14 interlocked with the rotary rod 13 and installed outside of the fuel tank 11, and a variable resistor 15 having a variable resistance according to its contact with the contact arm 14 (please refer to Korean Patent Laid-Open No. 2003-0006361).

However, the above-described adjustable resistive type sender unit 10 is influenced by contact resistance. Unfortunately therefore, measurement errors and the frequency of error occurrence caused by deterioration of durability and non-uniformity of the variable resistor 15 are high.

SUMMARY OF THE INVENTION

It is, therefore, an object of the present invention to provide a semipermanent fuel measuring device having a non-intrusive (or non-contact) structure between a rotor and a magneto resistive sensor, resulting in reducing of measurement errors that are usually caused by imperfect mechanical contact or corroded contacts.

To achieve the above object, there is provided a fuel measuring device, which includes: a float disposed inside a fuel tank; a rotatable body rotating by elevation of the float; a supporter for supporting the rotatable body; a magnet mounted on the rotatable body, the magnet generating a revolving magnetic field; and a magneto resistive sensor disposed at a distance from the rotatable body, the magneto resistive sensor detecting rotation angle of the revolving magnetic field.

Preferably, the magneto sensitive sensor is an Anistropic Magneto Resistive (AMR) sensor.

The fuel measuring device with the above constitution has less measurement errors that are usually caused by imperfect mechanical contact or corroded contacts and thus, it can be used semipermanently.

Preferably, the fuel measuring device further includes a housing combined with a printed circuit board to which the magneto sensitive sensor is coupled, and the supporter. Here, the printed circuit board and the rotatable body are fixed to the supporter, and then the supporter is combined with the housing. In other words, the rotatable body, the printed circuit board, and the supporter being assembled in one unit are combined with the housing. In this manner, the assembly process can be simplified and time taken for the assembly process is greatly reduced.

Further, the fuel measuring device further includes support parts supporting the rotatable body and the printed circuit board in the supporter. As a result, the rotatable body is not easily broken away from the housing during its rotation, and the printed circuit board can maintain its position.

Also, by making the support parts with elastic material, it becomes much easier to install the rotatable body to the supporter by turning over the support parts over using elastic nature thereof.

BRIEF DESCRIPTION OF THE DRAWINGS

The above objects, features and advantages of the present invention will become more apparent from the following detailed description when taken in conjunction with the accompanying drawings, in which:

FIG. 1 is a schematic diagram illustrating a related art gauge for use in a fuel tank;

FIG. 2 is a plan view illustrating a fuel measuring device according to a preferred embodiment of the present invention; and FIG. 3 is a cross sectional view taken along line A—A in FIG. 2.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

FIG. 2 is a plan view illustrating a fuel measuring device according to a preferred embodiment of the present invention, and FIG. 3 is a cross sectional view taken along line A—A in FIG. 2.

As illustrated in FIG. 2 and FIG. 3, the fuel measuring device 100 of the present invention includes a housing 600 where the device is housed in; a rotatable body 200 rotating by the elevation of a float 12 disposed inside of a fuel tank 11; a magnet 300 built in the rotatable body 200 for generating a revolving magnetic field; a magneto resistive sensor 500 that is installed in the vicinity of the rotatable body 200; a printed circuit board 700 to which the magneto resistive sensor 500 is coupled; and a supporter 400 which is mounted a printed circuit board 700 and the rotatable body 200 and also combined with the housing 600.

Preferably, the magneto resistive sensor is an AMR (Anistropic Magneto Resistive) sensor, and is disposed at the same line with the center of rotation of the magnet 300.

The housing 600 is a hollow hexahedron, and a circle-shaped opening 620 is formed on the front surface thereof.

The rotatable body 200 includes a cylinder 220 having a magnet 300 on the rotation axis, and a flange 240 formed on a peripheral surface of the cylinder 220. Also, the flange 240 includes extending parts 242 that are perpendicular to the flange 240 and protrude towards the opening on the front surface of the housing 600.

The supporter 400 has a pipe-shaped body 420, and there are bent parts 440 on one side of the body 420 to be in correspondence to the suspended parts 242.

The bent part 440 is composed of a protrusion 442 formed along an inner peripheral surface of one end of the body 420, and a jaw 444 that is formed with the a protrusion 442 perpendicularly and bent towards the inside of the housing 600. On the other hand, a fixed projection 460 is formed on the other end of the supporter 400 at regular intervals. As shown in FIG. 3 at the back of the housing 600, a block 800 having a fixed recess 860 in correspondence to the fixed projection 460 is fitted with the fixed projection 460. Here, the fixed recess 860 can be formed directly on the housing 600.

Referring again to FIG. 3, there are two support parts 480 at the central portion of the supporter 400, being protruded along the inner peripheral surface thereof.

As described above, the supporter 400 includes the bent parts 440 and the support parts 480, and accommodating grooves 446 are formed therebetween. The suspended parts 242 of the rotatable body 200 are fitted in the accommodating grooves 446. In this manner, the housing 600 is not easily broken away from the rotatable body 200 during its rotation.

Preferably, the support parts 480 are made of rubber. In so doing, it becomes easier to assemble the rotatable body 200 to the supporter 400 by turning the support parts 480 over the opposite side of the bent part 440 and fitting the flange 240 in the accommodating groove 446.

The printed circuit board (PCB) 700 is disposed between the rotatable body 200 and the housing 600, and has through holes 720 for the insertion of the fixed projections 460. To fix the PCB 700 to the supporter 400, the PCB 700 is first inserted in the fixed projections 460 of the supporter 400 via the through holes 720. When the PCB 700 is installed at the supporter 400, one side of the PCB 700 makes a surface contact with the support parts 480 and is supported thereby. In this way, the PCB 700 is immovably fixed to the supporter 400, securing its position.

The operation of the fuel measuring device of the present invention will now be described.

The support parts 480 are turned over to the opposite side of the bent parts 440, and the suspended parts 242 of the rotatable body 200 are accommodated to the accommodating grooves 446 formed on the supporter 400. By making the support parts 480 with rubber, it becomes much easier to install the rotatable body 200 to the supporter 400. Then, the PCB 700 is inserted in the fixed projections 460 of the supporter 400. Afterwards, the supporter 400 is fitted into the housing 600. Since the rotatable body 200, the supporter 400, and the PCB 700 are assembled in one unit, processing time is greatly reduced and the assembly process becomes much easier. Moreover, as depicted in FIG. 3, the support parts 480 formed on the supporter 400 support the flange 240 and one side of the PCB 700, so the rotatable body 200 is not easily separated from the accommodating groove 446 during its rotation, and at the same time, the PCB 700 can keep its position. For the fuel measuring device 100 with the above constitution to operate, the rotatable body 200 rotates by elevation of the float 12, and then the magnet 300 built in the central axis of the rotation of the rotatable body 200 also rotates. The AMR sensor 500 senses the amount of rotation of the magnet 300 to obtain the rotation angle (please refer to Korean Patent Laid-Open No. 2004-0023952). This rotation angle corresponds to level of the residual fuel.

Preferably, the fuel measuring device includes an operation/control unit for calculating the residual fuel based on the rotation angle, and displaying the calculated fuel level to a driver.

In conclusion, the fuel measuring device according to the present invention has the following advantages.

First, the fuel measuring device has the non-intrusive (or non-contact) structure between the rotor and the magneto resistive sensor, so measurement errors that are usually caused by imperfect mechanical contact or corroded contacts can be considerably reduced, and the fuel measuring device can also be used semipermanently.

Second, the fuel measuring device further includes the printed circuit board where the magneto resistive sensor is coupled, and the housing combined with the supporter. Especially, because not only the rotatable body but also the printed circuit board are fixed to the supporter, the housing is now combined with one assembly unit of the rotatable body, the supporter, and the printed circuit board. In this manner, the assembly process can be simplified and time taken for the assembly process is greatly reduced.

Third, the supporter further includes support parts for supporting the rotatable body and the printed circuit board. Therefore, the rotatable body is not easily broken away from the housing during its rotation, and the printed circuit board can maintain its position.

Fourth, by making the support parts with elastic materials (e.g., rubber), it becomes much easier to install the rotatable body to the supporter by turning the support parts over to the opposite side of the bent parts, and fitting the suspended parts of the rotatable body in the accommodating grooves formed on the supporter.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A fuel measuring device, comprising:
   a float disposed inside a fuel tank;
   a rotatable body disposed within a housing and being rotatable by elevation of the float;
   a supporter supporting the rotatable body;
   a magnet mounted on the rotatable body, the magnet generating a revolving magnetic field; and
   a magneto resistive sensor disposed at a distance from the rotatable body, the magneto resistive sensor detecting rotation angle of the revolving magnetic field,
   wherein the rotatable body comprises a cylinder having a flange provided on a peripheral surface of the cylinder and having extending parts that are generally perpendicular to the flange and protrude towards an opening on a front surface of the housing, and
   wherein the supporter comprises a pipe-shaped body and bent parts provided on one side of the pipe-shaped body, the bent parts being configured to correspond to the extending parts.

2. The device according to claim 1, wherein the magneto sensitive sensor is an Anistropic Magneto Resistive (AMR) sensor.

3. The device according to claim 2, further comprising:

a printed circuit board provided in the housing and coupled to the magneto sensitive sensor, wherein the printed circuit board is fixed to the supporter.

4. The device according to claim 3, wherein the supporter comprises support parts supporting the rotatable body and the printed circuit board.

5. The device according to claim 4, wherein the support parts are made of elastic material.

6. The device according to claim 1, further comprising:

a printed circuit board provided in the housing and coupled to the magneto sensitive sensor, wherein the printed circuit board is fixed to the supporter.

7. The device according to claim 6, wherein the supporter comprises support parts supporting the rotatable body and the printed circuit board.

8. The device according to claim 7, wherein the support parts are made of elastic material.

* * * * *